Patented July 3, 1951

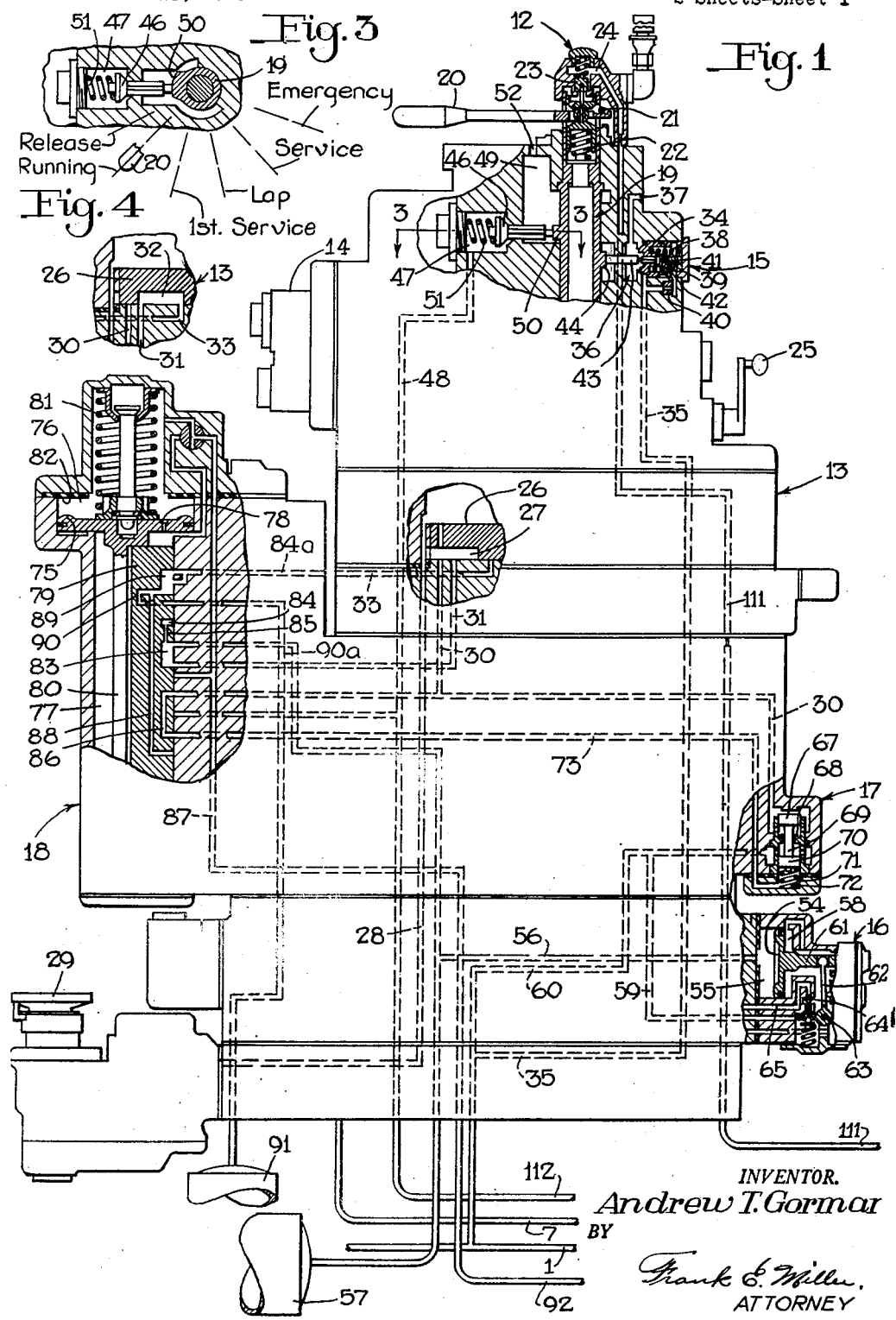

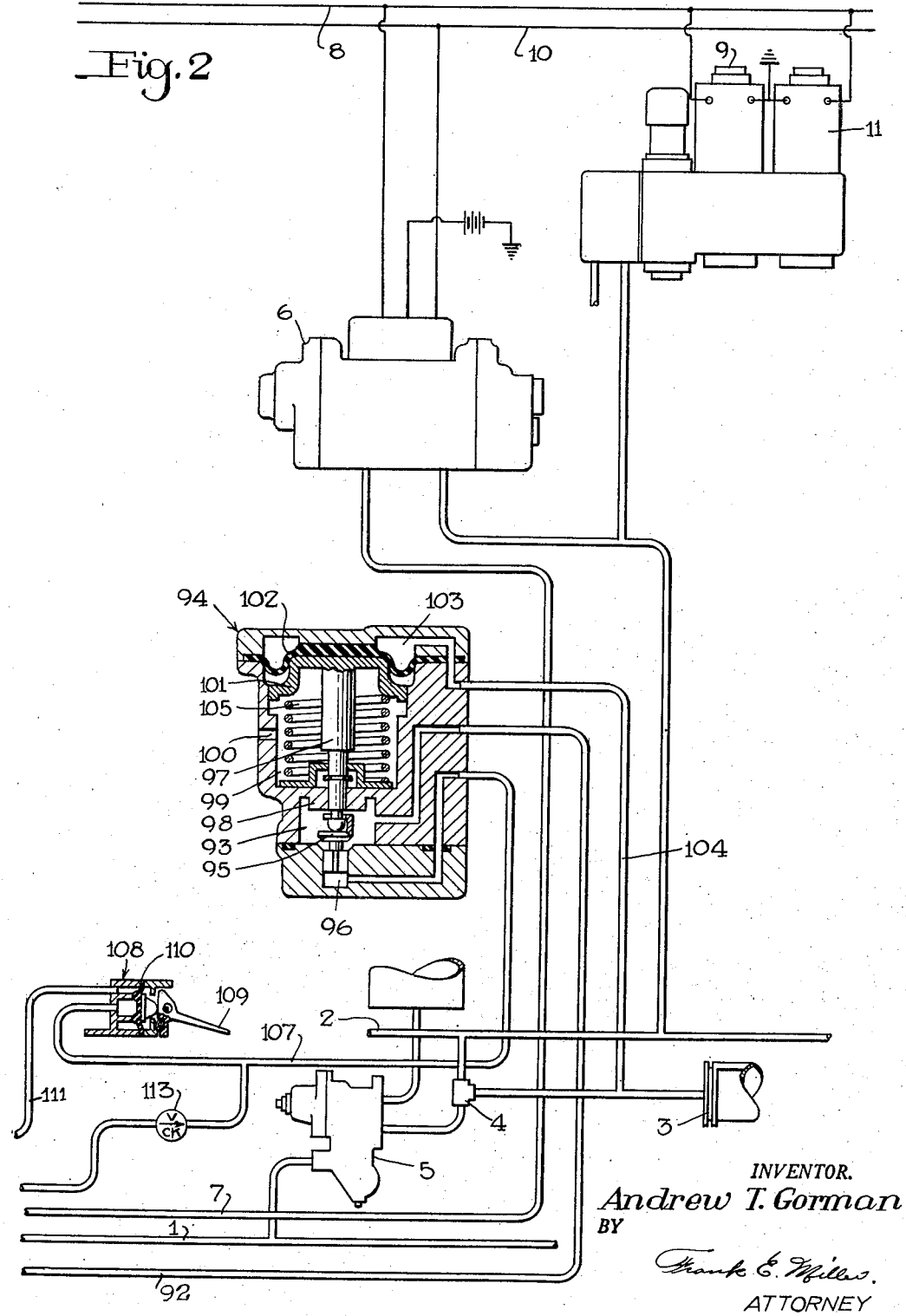

2,558,842

UNITED STATES PATENT OFFICE 2,558,842

SAFETY CONTROL EQUIPMENT FOR FLUID PRESSURE BRAKES

Andrew T. Gorman, Pitcairn, Pa., assignor to The Westinghouse Air Brake Company, Wilmerding, Pa., a corporation of Pennsylvania Application October 21, 1949, Serial No. 122,655

5 Claims. (Cl. 303—19)

This invention relates to fluid pressure brake equipment and more particularly to the type for use on railway locomotives.

The 24 RL Locomotive Brake Equipment shown and described in Westinghouse Air Brake Company's instruction pamphlet No. 5066 dated March 1948, and which equipment is similar to that disclosed in Patent No. 2,256,283 issued on September 16, 1941 to E. E. Hewitt et al., is for use on all types of present day locomotives including those employed in connection with the modern high speed trains on which the fluid pressure brakes are normally controlled on the electro-pneumatic straight air principle but which may be controlled on the purely pneumatic principle.

Forming a part of such brake equipment is a dead man's safety control arrangement comprising a brake application valve device which is automatically operative upon a reduction in pressure in a chamber to effect an automatic service application of brakes on the train. In order to prevent such operation of the brake application valve device when an application of brakes is not desired it is necessary that the engineer on the locomotive hold depressed safety control means either in the form of a foot treadle or a handle of his automatic brake valve device, since the release of either, with the other released, will cause venting of the chamber of the brake application valve device. To relieve the engineer of holding the treadle or handle depressed when an application of brakes, sufficient to insure the safety of the train, is in effect, a cut-off valve device is provided to close the venting communication from the chamber of the brake application valve device controlled by the treadle and engineer's brake valve handle.

The engineer's brake valve device comprises the usual automatic portion including a rotary valve having the usual release, running, first service, lap, service and emergency positions for controlling the application and release of brakes on a train through the medium of a brake pipe in the usual manner, and a self-lapping straight air portion for controlling the brakes on the train on the electro-pneumatic straight air principle, a single handle being employed to selectively operate either of said portions according to the position of a selector handle on the side of the brake valve device. Moreover, when the selector handle is positioned to provide for electro-pneumatic straight air control of the brakes, movement of the brake valve handle to its emergency position will effect an emergency reduction in pressure in the usual brake pipe and operation of the rotary valve out of its running position to its lap position to cut off supply of fluid under pressure to the brake pipe, whereby an emergency application of brakes will be obtained.

If, when the selector handle on the brake valve device is in the position to provide for electro-pneumatic straight air control of brakes on the train, the brake valve device is operated to effect such an application, but the application fails to materialize for any reason, such as due to a broken train wire, a brake application may positively be obtained so as to insure stopping of the train by moving the brake valve handle to its emergency position for venting the brake pipe. The use of emergency position of the brake valve device for bringing a train to a stop is however objectionable on certain railroads except as a last resort.

Moreover, movement of the selector handle to the position for providing usual service control of the brakes by the rotary valve through the medium of the brake pipe at a time when an electro-pneumatic straight air application of brakes fails to materialize is considered hazardous by certain railroads on account of the delay involved in obtaining the application. To avoid such delay in case of failure of the electro-pneumatic straight air apparatus to operate as intended and also to avoid having to effect an emergency application of brakes to bring the train to a stop it is therefore desirable to effect a service application of fluid pressure brakes on a train by release of the brake valve handle or foot treadle to cause operation of the brake application valve device to effect a service reduction in pressure in the brake pipe and thereby a service application of brakes on the train. If, however, the brake valve handle remains in the position for effecting an electro-pneumatic straight air application of the brakes when it and/or the treadle is released to effect a safety control service application of brakes, the cut-off valve device will operate, when the brakes are applied to its operating pressure, to close the vent from the chamber of the brake application valve device controlled by the brake valve handle and treadle whereupon said chamber will recharge with fluid under pressure and the brake application valve device will return to normal position for effecting recharge of the brake pipe and thereby release of the brake application through the train. Such release will continue until the brake applying pressure on the locomotive is reduced to some low degree at which time the cut-off valve device will respond thereto to open the chamber in the brake application valve device again to atmosphere by way of the brake valve handle and treadle, and a reapplication of brakes will occur to the degree where the cut-off valve device will again operate to cause a release of such application. The brakes will thus alternately apply and then release to a low degree with the result that the train will not be brought to a stop as desired. Such alternate application and release of brakes on the train would not occur if the brake valve handle were returned to its running position when an electro-pneumatic straight air application of the brakes failed to materialize since in the running position the chamber of the brake application valve device would remain vented through a valve in the brake valve device with said application valve device in the position for effecting an application of brakes until the engineer himself desired to release such an application, but under the conditions set forth it is not practical to expect the engineer to return his brake valve handle to running position.

The principal object of the invention is therefore the provision of means adapted to be added to the 24 RL Locomotive Brake Equipment for insuring an automatic service application of brakes upon release of pressure by the operator on the brake valve handle or foot treadle and with the brake valve handle in a position for effecting an electro-pneumatic straight air application of brakes and which means will have no effect upon or change in any way other operating characteristics of the brake equipment.

Other objects and advantages will become apparent from the following more detailed description of the invention.

In the accompanying drawings; Figs. 1 and 2, when the right hand edge of Fig. 1 is matched to the left hand edge of Fig. 2, is a diagrammatic view, partly in section and partly in outline, of a locomotive brake equipment embodying the invention; Fig. 3 is a sectional view taken on the line 3—3 in Fig. 1; and Fig. 4 is a view similar to a portion of Fig. 1 but with a part in a different control position.

Description

The brake equipment shown in the drawing, except for a portion thereof constituting the invention, may be identical to that fully disclosed in the instruction pamphlet before referred to and generally similar to that disclosed in the hereinbefore referred to patent, in view of which only such parts of said equipment are shown in the drawings as are deemed necessary to a clear understanding of the invention.

In the drawings, the reference numeral 1 designates a brake pipe and numeral 2 designates a straight air pipe both of which pipes are adapted to extend through a train and through the medium of which the brakes on the train are adapted to be controlled either on the purely pneumatic principle or on the electro-pneumatic straight air principle, respectively.

Reference numeral 3 designates a brake cylinder device arranged to be operated by fluid under pressure for applying the brakes on the locomotive and such fluid may be obtained, for example, either from the straight air pipe 2 through one end of a double check valve device 4 or from a brake controlling valve device 5 connected to the opposite end of the double check valve device and which is adapted to respond to a reduction in pressure in the brake pipe 1 for supplying such fluid.

The reference numeral 6 designates a master switch device adapted to operate upon supply of fluid under pressure to a straight air control pipe 7 to energize an application train wire 8 for effecting energization of an application magnet device 9 to supply fluid under pressure to the straight air pipe 2. The straight air pipe 2 is connected to the master switch device 6 so that said switch device will operate in response to increase in pressure in said pipe to a degree slightly exceeding that in the straight air control pipe 7 to effect deenergization of the application wire 8 and thereby of the application magnet device 9 to terminate supply of fluid under pressure to the straight air pipe 2 and thereby to the brake cylinder device 3. Upon a reduction in pressure in the straight air control pipe 7 pressure of fluid in the straight air pipe 2 will operate the master switch device 6 to effect deenergization of a release control wire 10 and thereby of a release magnet device 11 to release fluid under pressure from the straight air pipe 2 to a degree corresponding to the reduction in pressure in the straight air control pipe 7.

It will thus be seen that in response to variations in pressure in the straight air control pipe 7, the master switch device 6, as controlled by such pressure and the pressure of fluid in the straight air pipe 3, will control the application and release magnet devices 9 and 11 to effect corresponding variations in pressure in the straight air pipe 2 and the brake cylinder device 3 and thereby corresponding degrees of brake application on the locomotive.

In a train, application and release magnets, like 9 and 11, on each car of the train will operate in synchronism with those on the locomotive for effecting like degrees of brake application on said cars, such control of the brakes on a train constituting what is known as electro-pneumatic straight air control.

Operation of the brake controlling valve device 5 in response to a reduction or increase in pressure of fluid in brake pipe 1 to either supply fluid under pressure to or release fluid under pressure from, respectively, the brake cylinder device 3 constitutes what is known as control of brakes on the purely pneumatic principle, it being understood that on each car of the train there will be a brake controlling valve device, such as 5, arranged for control by pressure of fluid in said brake pipe on the car whereby through the medium of said brake pipe the brakes on all cars of the train may be controlled.

The brake pipe 1 and straight air control pipe 7 are connected to an engineer's brake valve device designated generally by the reference numeral 12.

The engineer's brake valve device 12 comprises an automatic brake control portion 13 for controlling the brakes on a train through the medium of brake pipe 1, a self-lapping straight air control valve device 14 for controlling the brakes on the train through the medium of the straight air pipe 2, an emergency valve device 15, an equalizing discharge valve device 16, a brake pipe cut-off valve device 17 and a brake application valve device 18.

The brake valve device 12 further comprises a vertically disposed shaft 19 suitably journaled in the casing and connected to said shaft for rotating same is a handle 20 movable in a horizontal plane to release, running, first service, lap, and emergency positions, as designated by suitable legends in Fig. 3. The handle 20 is fulcrumed for vertical movement relative to shaft 19 on a pin 21 carried by said shaft. During running of a train with the brakes thereon released either the handle 20, or a device to be subsequently described, is adapted to be held in a depressed position. With handle 20 depressed, in which position it is shown in the drawing, a spring 22 carried by the shaft 19 is compressed. Upon release of manual pressure on handle 20 the spring 22 is adapted to turn said handle about the pin 21 for opening a valve 23 to establish a vent from a chamber 24 containing said valve to atmosphere. With handle 20 in its normal depressed position the valve 23 will be closed.

Mounted on one side of the brake valve housing is a selector handle 25 for selectively connecting either the automatic brake control portion 13 or the self-lapping straight air control valve device 14 to shaft 19 for control thereby. In the straight air position of the selector handle 25, the self-lapping straight air control valve device 14 will therefore be operable by shaft 19 and the automatic brake control portion 13 will not be operable, while in the automatic position of said handle, the latter portion will be operable by said shaft and the former portion not operable.

The automatic brake control portion 13 comprises a rotary valve 26 adapted when the selector handle 25 is in its automatic position to be turned by the handle 20 to positions corresponding to those of said handle indicated in Fig. 3. In running position of handle 20 and the rotary valve 26 a cavity 27 in said valve establishes communication between a passage 28 adapted to be supplied with fluid under pressure from a feed valve device 29 in the usual manner, and passages 30 and 31, the passage 30 leading to the brake application valve device 18 and to the brake pipe cut-off valve device 17, while the passage 31 leads only to the brake application valve device 18. In service position of the rotary valve 26 (Fig. 4) the communication just described is adapted to be closed, passage 30 is adapted to be lapped by the rotary valve 26, while passage 31 is adapted to be connected via cavity 32 in said rotary valve to an atmospheric vent port 33. In lap position of the handle 20 and rotary valve 26 the passage 33 is also adapted to be lapped by said rotary valve.

When the selector handle 25 is in its straight air position providing for control of the self-lapping straight air control valve device 14 to regulate pressure of fluid in the straight air control pipe 7 the rotary valve 26 is adapted to remain in running position in which it is shown in Fig. 1 during operation of the handle in a brake application zone extending between the running and service positions in Fig. 3, but upon movement of the handle 20 to emergency position the rotary valve 26 is adapted to be moved from its running position to its lap position. By movement of the handle 20 in the application zone just mentioned the self-lapping straight air control valve device 14 is adapted to provide fluid in the straight air pipe 7 at a pressure proportional to the distance said handle is out of its running position.

The emergency valve device 15 comprises a valve piston 34 arranged to cooperate with a seat in the brake valve casing for controlling communication between a passage 35 connected to brake pipe 1 and a chamber 36 which is open to atmosphere through a passage 37. The valve piston 34 is normally urged to its seat for closing the communication just mentioned by a spring 38 and pressure of fluid in a chamber 39 which is open to the passage 35 through a choke 40. The valve piston 34 is provided with an axial bore opening chamber 39 to chamber 36 and slidably mounted in this bore is a fluted stem of a valve 41 contained in chamber 39 and normally urged to its seat against said valve piston by a spring 42, said stem extending into chamber 36 for engagement by a plunger 43 slidably mounted in a suitable bore in the casing in alignment with a cam 44 provided on the shaft 19. When the handle 20 is turned to emergency position the cam 44 is operative to actuate plunger 43 to first unseat valve 41 for releasing fluid under pressure from chamber 39 followed by engagement of said plunger with said valve piston to open said valve piston for thereby opening passage 35 and the brake pipe 1 to atmosphere by way of passage 37 for effecting an emergency reduction in pressure in said brake pipe. Except in emergency position of brake valve handle 20 the valve piston 34 is adapted to be seated as well as the valve 41.

At the opposite side of shaft 19 is a poppet valve 46 contained in a chamber 47 open to a passage 48 and having a fluted stem extending through a suitable bore in the casing into a chamber 49 for engagement with a cam 50 provided on said shaft. In release, running and first service positions of handle 20 the cam 50 is adapted to open valve 46 while in the other positions of said handle the valve 46 is adapted to be seated by a spring 51. Chamber 49 is open to atmosphere through a passage 52.

The equalizing discharge valve mechanism 16 comprises a piston 54 at one side of which is a chamber 55 open by way of a passage 56 to the brake application valve device 18 and to an equalizing reservoir 57. At the opposite side of piston 54 is a chamber 58 open by way of passages 59 and 60 to brake pipe 1 and into which projects a stem 61 from said piston. Connected to the stem 61 is the end of one arm of a bell crank 62 fulcrumed at its knee on a pin 63 secured in the casing. Connected to the other arm of the bell crank 62 is a brake pipe discharge valve 64 for controlling communication between the brake pipe chamber 58, and thereby the brake pipe 1, and an atmospheric vent passage 65.

The brake pipe cut-off valve device 17 comprises a valve 67 arranged to cooperate with a seat 68 for controlling communication between passage 30 and the brake pipe passage 60. The cut-off valve 67 is secured to one end of a stem 69 connecting said valve to a piston 70 subject on one side to brake pipe pressure from passage 60 and on the opposite side to pressure of fluid in a chamber 71 and that of a spring 72 contained in said chamber. Chamber 71 is connected to a passage 73 leading to the brake application valve device 18.

The brake application valve device 18 comprises a piston 75 at one side of which is a chamber 76 while at the opposite side is a valve chamber 77 adapted to be constantly supplied with fluid under pressure. A restricted port 78 through piston 75 provides for charging of chamber 76 with fluid under pressure from the valve chamber 77. Contained in the valve chamber 77 is a slide valve 79 connected for movement by and with the piston 75 through the medium of a stem 80. When chamber 76 is supplied with fluid at sufficient pressure via port 78, a spring 81 contained in said chamber is adapted to move the piston 75 and slide valve 79 to a normal position in which they are shown in the drawing. Upon venting of fluid under pressure from chamber 76 at a rate exceeding the supply through the restricted port 78, the pressure of fluid in chamber 77 is adapted to move said piston and thereby the slide valve 79 against spring 81 to a brake application position defined by contact between said piston and a gasket 82.

The brake application slide valve 79 has a cavity 83 for in the normal position of said valve establishing communication between passage 31 from the rotary valve 26 and passage 56 leading to the equalizing reservoir 57 and to position chamber 55 in the equalizing discharge valve mechanism 16, while in the brake application position of said valve this communication is adapted to be closed and the passage 56 connected to a reduction limiting reservoir 91 by way of a passage 90a, a cavity 84 in said slide valve and a restricted port 85 connecting said cavity to the cavity 83. The slide valve 79 also has a passage 86 for in the normal position of said valve opening passage 30 from the rotary valve to passage 73 and in the brake application position of said valve this communication is closed and passage 86 opens passage 48 to a passage 87 which is connected to piston chamber 76. In the brake application position of slide valve 79 a passage 88 and cavity 89 in said valve are arranged to connect passage 73 from the brake pipe cut-off valve device 17 to an atmospheric vent port 84a, while in the normal position of said slide valve a port 90 open to cavity 89 is arranged to open passage 90a to the atmospheric vent port 84a, the passage 90a being connected to the reduction limiting reservoir 91.

The passage 87 is connected to a pipe 92 leading to a chamber 93 in an application insuring valve device 94. The insuring valve device 94 comprises a valve 95 contained in chamber 93 and arranged to control communication therebetween and a chamber 96. The valve 95 is connected for movement to one end of a stem 97 extending through a suitable bore in a partition wall 98 separating said chamber from a chamber 99 which is open to atmosphere through a port 100. Secured to the opposite end of stem 97 within chamber 99 is a follower head 101 engaging one side of a flexible diaphragm 102. At the opposite side of diaphragm 102 is a pressure chamber 103 which is connected by a pipe 104 to, for example, the brake cylinder device 3 whereby when an application of brakes is in effect on the locomotive the diaphragm 102 will be subject in chamber 103 to fluid at brake applying pressure. The side of diaphragm 102 opposite chamber 103 is subject to atmospheric pressure in chamber 99 as will be seen. A spring 105 contained in chamber 99 acts on the follower head 101 and thereby the diaphragm 102 with a chosen degree of pressure such as to hold diaphragm 102 in the position in which it is shown in the drawing to hold the valve 95 open until sufficient pressure is obtained in the brake cylinder device 3 to insure the safety of the locomotive. Any further increase in pressure in chamber 103 will then deflect the diaphragm 102 against spring 105 to close valve 95 and thereby communication between chambers 93 and 96. At a lower pressure the spring 105 will actuate the diaphragm 102 to open valve 95. In practice, the diaphragm 102 may be thus actuated by pressure of fluid in chamber 103 to close the valve 95 when such pressure is for example around 30 pounds and to permit opening of said valve by spring 105 when such pressure is around 20 pounds.

Chamber 96 in the insuring valve device 94 is connected by a pipe 107 to a treadle valve device 108 comprising a treadle 109 adapted to be depressed by the engineer to actuate a diaphragm 110 for closing communication between said pipe and a pipe 111 when the brakes on the locomotive and cars of a train are released or applied to a degree less than required to close valve 95 in the insuring valve device 94. Upon release of pressure on treadle 109 the diaphragm 110 is adapted to deflect out of the position in which it is shown in the drawing for opening communication between pipes 107 and 14. The pipe 14 is connected to passage 24 provided in the brake valve device above the handle 20 by way of a passage 111a extending through the brake valve device, whereby depression of the handle 20 to permit closing of valve 23 will serve the same purpose as depression of the treadle 109. The depression of either the treadle 109 or the brake valve handle 20 will accomplish the same end whereby either one or the other may be depressed, as required to relieve the engineer, but both need not be held depressed at the same time.

*Operation*

In operation, let it be assumed that the valve chamber 77 of the brake application valve device 18 is charged with fluid under pressure and that either the treadle 109 or the brake valve handle 20 is depressed. Under this condition fluid under pressure from valve chamber 77 will equalize through port 78 into piston chamber 76 of the brake application valve device and then through the passage 87, pipe 92 and past the open valve 95 in the cut-off valve device 94 (assuming that the brakes on the locomotive are not applied) into chamber 96 and pipe 107 or through said pipe into pipe 111 depending upon whether the treadle 109 or brake valve handle 20 is depressed. When the pressure of fluid in piston chamber 76 is thus sufficiently increased, spring 81 will move the piston 75 and slide valve 79 to their normal position in which they are shown in the drawing and in which cavity 83 will open passage 31 to passage 56, cavity 86 will open passage 30 to passage 73 and port 90 and cavity 89 will open the reduction limiting reservoir 91 to atmosphere by way of the atmospheric port 84a.

Let it further be assumed that the brake valve handle 20 is in running position whereby the rotary valve 26 will be likewise positioned regardless of the position of the selector handle 25. With the rotary valve 26 in running position, fluid under pressure supplied by the feed valve device 29 to passage 28 will flow therefrom through cavity 27 in said rotary valve to passage 31 and then through cavity 83 in the brake application slide valve 79 to passage 56 leading to the equalizing reservoir 57 and the equalizing piston chamber 55 whereby said reservoir and chamber will become charged with fluid at the pressure supplied by said feed valve device. At the same time, fluid supplied by the feed valve device to cavity 27 in the rotary valve 26 will flow to passage 30 and thence to the cut-off valve 67 as well as through cavity 86 in the brake application slide valve 79 to passage 73 leading to piston chamber 71 of the cut-off valve device 17. With piston chamber 71 thus charged with fluid at the pressure supplied by the feed valve device, spring 72 will actuate piston 70 to open valve 67 whereby fluid at feed valve pressure present in passage 30 will flow past said valve to passage 60 and thence to chamber 58 in the equalizing discharge valve mechanism 16 and to the brake pipe 1 for charging chamber 58 and said brake pipe. The brake controlling valve device 5 will operate to its release position in response to this charging of brake pipe 1 to open to atmosphere its pipe connection with the double check valve 4. With the brake valve handle 20 in its running position, the self-lapping straight air control valve device 14 will operate to open the straight air control pipe 7 to atmosphere whereby through the medium of the master switch device 6 and the application and release magnet valve devices 9 and 11 the straight air pipe 2 and its connection to the double check valve device 4 will be vented. The brakes on the locomotive will thus be released.

Now assuming that the selector handle 25 is in its straight air position, if the brake valve handle 20 is moved out of its running position in the direction of service position the self-lapping straight air control valve device 14 will operate to supply fluid to the straight air control pipe 7 at a pressure corresponding to such movement for thereby effecting operation of the master switch device 6 and application magnet device 9 to supply fluid at a corresponding pressure to the brake cylinder device 3 to effect an application of brakes. If the handle 20 is returned to running position the self-lapping straight air control valve device 14 will operate to release such an application of brakes.

Now let it be assumed that the selector handle 25 is in its automatic position and that the brake handle 20 is moved from running position to service position. The rotary valve 26 will thereby be moved to the position in which it is shown in Fig. 4 for cutting off supply of fluid under pressure from the feed valve passage 28 to passage 30 and thence to the brake pipe 1 and for at the same time releasing fluid under pressure from the equalizing reservoir 57 and equalizing piston chamber 55 to atmosphere via cavity 32 in said rotary valve and passage 33. In response to such reduction in pressure at one side of the equalizing discharge valve piston 54, brake pipe pressure acting on the opposite side in chamber 58 will move said piston in the direction of chamber 55 for thereby actuating bell crank 62 to open the brake pipe discharge valve 64 for releasing fluid under pressure from the brake pipe 1, in response to which the brake controlling valve device 5 will operate to supply fluid to the brake cylinder device 3 to apply the brakes on the locomotive to a degree proportional to the reduction in pressure in the equalizing reservoir 57. If less than a full service application of brakes is desired, then when the desired reduction in pressure in the equalizing reservoir 57 and piston chamber 55 is obtained, the handle 20 will be moved from service position back to lap position for closing off discharge of fluid from said reservoir and chamber whereby when the pressure of fluid in brake pipe 1 acting in chamber 58 at the opposite side of equalizing piston 54 becomes reduced to slightly below that in chamber 55, said piston will operate the bell crank 62 to close the discharge valve 64 for thereby limiting the reduction in pressure in brake pipe 1 to a corresponding degree, and the pressure of fluid obtained in the brake cylinder 3 to a proportional degree, in a well-known manner.

When the pressure of fluid obtained in the brake cylinder device 3 by operation of either rotary valve 26 or of the self-lapping straight air control valve device 14 is sufficient to insure stopping of the train, such pressure acting in chamber 103 of the application insuring valve device 94 will deflect diaphragm 102 to close valve 95 for thereby closing communication between chamber 76 in the brake application valve device 18 and the treadle valve device 108 whereupon pressure of the engineer can be relieved on treadle 109 or brake valve handle 20, whichever has been held depressed, without venting fluid under pressure from piston chamber 76. However, if the degree of brake application is insufficient to close valve 95 in the insuring valve device 94 and pressure of the engineer is relieved on both the treadle 109 and brake valve handle 20, the pipe 107 and thereby pipe 92 connected to the brake valve device will both be vented through the insuring valve device 94, the foot valve device 108, and past the open valve 23 controlled by the brake valve handle 20. As a result, fluid under pressure will be vented from piston chamber 76 in the brake application valve device 18 and the piston 75 will operate to move the slide valve 79 to its brake application position.

When the slide valve 79 is thus moved to its brake application position piston chamber 71 in the cut-off valve device 17 will be vented through passage 88 in the application slide valve 77 and the atmospheric passage 84a as a result of which brake pipe pressure acting on the opposite side of piston 70 will actuate said piston to close valve 67 and thereby the communication through which fluid under pressure is normally supplied to the brake pipe. At the same time the equalizing piston chamber 55 will be disconnected from passage 31 leading to the rotary valve 26 and opened through cavities 83, 84 and restricted port 85 in said valve to passage 90a leading to the reduction limiting reservoir 91 whereby the pressure of fluid in the equalizing reservoir 57 and equalizing discharge valve piston chamber 55 will reduce to equalization into said reduction reservoir and the discharge valve mechanism 16 will operate to effect a service reduction in pressure in brake pipe 1 for causing operation of the brake controlling valve device 5 to supply fluid to the brake cylinder device 3 to effect a service application of brakes on the locomotive. The volume of the reduction limiting reservoir 91 may be such that the reduction in pressure in the equalizing reservoir 57 due to equalizing into said limiting reservoir will be sufficient to insure a full service application of the brakes on the locomotive.

In the brake application position of the brake application valve device 18, piston chamber 76 is connected by way of passage 87 and passage 86 in the slide valve 79 to passage 48 leading to the poppet valve chamber 47 in the brake valve device whereby with the poppet valve 46 open in the release, running and first service positions of the brake valve handle 20, the application piston chamber 76 will remain vented even upon subsequent depression of the treadle 109 or depressing of handle 20, to insure a full service application of brakes on the locomotive and thereby stopping of the locomotive and connected train in case of incapacitation of the engineer or failure to maintain the treadle 109 or handle 20 depressed as intended to safeguard the locomotive and train. If, however, the handle 20 is moved past the first service position at the time the treadle 109 and/or handle 20 are relieved of pressure, the poppet valve 46 will be closed so that even though the brake application piston 75 and slide valve 79 move to their application position, the pressure of fluid obtained in the brake cylinder device 3 and thereby in chamber 103 of the insuring valve device 94, either by operation of the straight air control valve device 14 or rotary valve 26, will eventually become sufficient to operate said insuring valve device to close valve 95 whereby piston chamber 76 of the brake application valve device will be recharged with fluid under pressure to permit spring 81 to return piston 75 and slide valve 79 to their normal position.

Regardless of the position of the selector handle 25, the brake valve handle 20 upon movement to its emergency position will effect opening of the emergency valve piston 34 for thereby effecting a sudden emergency reduction in pressure in brake pipe 1 for in turn causing operation of the brake controlling valve device 5 to supply fluid under pressure to the brake cylinder device 3 to effect an application of brakes on the locomotive for bringing the locomotive to a stop.

Now let it be assumed that with the selector handle 25 in its straight air position, the brake valve handle 20 is moved into its application zone for causing operation of the self-lapping straight air control valve device 14 to effect an electropneumatic straight air application of brakes on the locomotive, but that such application fails to materialize due, for instance, to failure in said valve device or in the master switch device 6 or in the application magnet device 11 or possibly due to breaking of the application train wire 8. Under such a condition the engineer may move the handle 20 to its emergency position for effecting an emergency application of the fluid pressure brakes on the locomotive, as above mentioned, if he so desires. If, however, under such a condition the handle 20 is allowed to remain in its brake application zone past first service position in which the poppet valve 46 is closed and the engineer removes pressure on the brake valve handle 20 and/or treadle 109 for venting fluid under pressure from the application piston chamber 76, the application piston 75 and slide valve 79 will move to application position. In the application position of slide valve 79 the cut-off valve device 17 will operate to cut-off further flow of fluid under pressure to the brake pipe 1 and at the same time the equalizing discharge valve mechanism 16 will also operate as hereinbefore described to reduce the pressure of fluid in the brake pipe 1 for in turn causing operation of the brake controlling valve device 5 to supply fluid under pressure to the brake cylinder device 3 to apply the locomotive brakes and such pressure will become effective through pipe 104 in diaphragm 103 of the insuring valve device 94. When the pressure of fluid thus obtained in the brake cylinder device 3 becomes sufficient to deflect diaphragm 102 in the insuring valve device 94 for closing valve 95, such closure will disconnect the brake application piston chamber 76 from its atmospheric vent through the operator's treadle device 108 and the open valve 23 controlled by the brake valve handle, as a result of which, the brake application piston chamber 76 will become charged with fluid under pressure by way of port 78 in the piston 75 and spring 81 will return said piston and the slide valve 79 to their normal position. Upon the return of slide valve 79 to its normal position the cut-off valve device 17 will reopen to permit recharging of the brake pipe by supply of fluid under pressure through the rotary valve 26 as previously described and the brake controlling valve device 5 will respond to such recharging to effect release of fluid under pressure from the brake cylinder device 3 and thereby from chamber 103 in the insuring valve device 94. When the pressure of fluid in chamber 103 of the insuring valve device 94 is thus sufficiently reduced said device will operate to reopen valve 95 therein for again venting fluid under pressure from piston chamber 76 in the brake application valve device to atmosphere by way of the treadle valve device 108 and valve 23 controlled by the brake valve handle 20. The brake application valve device 18 will then again operate to effect a reduction in pressure in brake pipe 1 whereby the brake controlling valve device 5 will operate to again supply fluid under pressure to the brake cylinder device 3 until the insuring valve device 94 again operates in response to such pressure to disconnect the brake application piston chamber 76 from its atmospheric vent through treadle device 108 whereupon the brake application device 18 will again return to normal position. The brake application valve device 18 will thus alternately move to its application position for effecting an application of brakes on the locomotive and then to its normal position for releasing such application with the result that stopping of the locomotive will be unduly delayed.

In order to insure that the brake application valve device 18 will not operate to effect a partial service application of brakes on the locomotive and then a partial release of such application and cause unnecessary delay of stopping of the locomotive at a time when the brake valve handle 20 is in a position for causing an electro-pneumatic straight air application of brakes, which however does not materialize, and in which position the valve 46 is closed, passage 48, according to the invention, is connected to a pipe 112 and thence through a check valve 113 to pipe 107 connecting the insuring valve device 94 to the treadle device 108. The check valve 103 is arranged to permit flow of fluid under pressure from pipe 112 to pipe 107, whereby when the application piston chamber 76 is vented to atmosphere by way of the insuring valve device 94 in response to release of manual pressure on the treadle 109 and brake valve handle 20 such venting will be maintained by way of passage 86 in slide valve 79 and passage 48, pipe 112 and through the check valve device 113 to pipe 107 which will remain open to atmosphere as long as the treadle 109 and brake valve handle 20 are relieved of pressure regardless of operation of the insuring valve device 94, it being noted that this vent from the brake application piston chamber 76 by-passes said insuring valve device. With this arrangement if an electro-pneumatic straight air application of brakes on the locomotive fails to materialize with the poppet valve 46 closed and the operator removes pressure from treadle 109 and brake valve handle 20, operation of the brake application valve device 18 to effect a full service application of brakes is assured even upon closing of valve 95 in the insuring valve device 94.

The check valve 113 is provided to prevent loss of fluid under pressure from pipe 107 through the open poppet valve 46 in the brake valve device when the brake valve handle 20 is in release or running position with the brakes released and either the treadle 109 or brake valve handle 20 is depressed, under which condition the pipe 92 will be charged with fluid under pressure from the brake application piston chamber 76 and be open through the insuring valve device 94 to said pipe 107.

*Summary*

It will now be seen that I have provided means adapted to be associated with the 24 RL Locomotive Brake Equipment for insuring a full service pneumatic application of brakes on the locomotive and connected cars of the train in response to operation of the safety control means on the locomotive in case an electro-pneumatic straight air application of brakes, sufficient to insure safety of the train, fails to materialize.

Having now described the invention what I claim as new and desire to secure by Letters Patent, is:

1. In a locomotive brake equipment, in combination, means including an operator's brake valve device operative to effect an application of locomotive brakes, an operator's control device and brake application means operative from a normal position in response to release of manual pressure on said control device to also effect an application of locomotive brakes, application insuring means arranged to respond to a chosen degree of brake application effected by operation of either said brake valve device or said brake application means to disestablish the control connection between said brake application means and said control device and in response to a lesser degree of brake application to establish said control connection, and means for establishing a control connection between said brake application means and control device by-passing said insuring means only with said brake application means operating to effect an application of brakes.

2. In a locomotive brake equipment, in combination, and engineer's brake valve device for effecting an application of locomotive brakes, brake application means operable to an application position in response to a reduction in pressure of fluid in a chamber to effect an application of locomotive brakes, and operative to a normal position in response to charging of said chamber with fluid under pressure, means operative upon release of manual pressure to establish a fluid pressure venting communication from said chamber, application insuring means responsive to a chosen degree of brake application to close said communication and to a lesser degree of brake application to open said communication, means for charging said chamber with fluid under pressure with said communication closed, and means cooperative with said brake application means in said application position and with said brake valve device in a position for effecting an application of brakes to establish a vent from said chamber by-passing said insuring means which vent is closed by said application means in said normal position.

3. In a locomotive brake equipment, in combination, fluid pressure operable brake applying means, an engineer's brake valve device for effecting supply of fluid under pressure to operate said brake applying means, brake application means operative in response to venting of fluid under pressure from a chamber to a brake application position for effecting supply of fluid under pressure to operate said brake applying means and in response to supply of fluid under pressure to said chamber to a normal position, a double check valve operable by fluid under pressure supplied by operation of either said brake valve device or said brake application means to close communication between the other and said brake applying means, safety control means operative upon release of manual pressure to vent fluid under pressure from said chamber, application insuring means responsive to a chosen pressure of fluid in said brake applying means to close communication between said brake application valve device and safety control means and responsive to a lesser pressure of fluid in said brake applying means to open such communication, means for supplying fluid under pressure to said chamber, and means cooperative with said brake application means in its brake applying position to establish a communication between said chamber and safety control means which by-passes said insuring means and which communication is closed by said application means in its normal position.

4. In a locomotive brake equipment, in combination, means including an engineer's brake valve device for effecting an application of brakes, a brake pipe, brake controlling means responsive to a reduction in pressure of fluid in said brake pipe to supply fluid under pressure to effect an application of brakes and responsive to an increase in pressure in said brake pipe to release such fluid under pressure, means including brake application means operable upon a reduction in pressure in a chamber to an application position for cutting off supply of fluid under pressure to and for effecting a reduction in pressure of fluid in said brake pipe and operable upon charging of said chamber with fluid under pressure to a normal position for supplying fluid under pressure to said brake pipe, safety control means operative upon release of manual pressure to establish a communication from said chamber for reducing pressure therein, means operative upon closing said communication to charge said chamber with fluid under pressure, application insuring means arranged to be operated by a chosen degree of brake application effected by operation of either said brake valve device or said brake controlling means to close said communication to said safety control means and responsive to a lesser degree of brake application to open said communication, a passageway, said brake application means opening said chamber to said passageway in the application position thereof and disconnecting said passageway from said chamber in its normal position, means for venting said passageway with less than said chosen degree of brake application and for closing such vent with a greater degree of brake application, and one-way flow means opening said passageway to said safety control means in by-passing relation to said cut-off means.

5. In a locomotive brake equipment, in combination, means including an engineer's brake valve device comprising a handle for effecting an application of locomotive brakes to a degree corresponding to the extent of movement of said handle from a normal position, brake application means responsive to venting of fluid under pressure from a chamber to a brake application position to effect an application of brakes and responsive to charging of said chamber with fluid under pressure to a normal position, safety control means responsive to release of manual pressure for venting said chamber, means for charging said chamber upon applying manual pressure to said safety control means, application insuring means operative in response to a chosen degree of brake application effected by operation of either said engineer's brake valve device or said brake application means to close communication between said brake applying means and safety control means and to open said communication for a lesser degree of brake application, a passageway, a valve controlled by said brake valve device for opening said passageway to atmosphere with said handle in a position to provide less than said chosen degree of brake application and for closing such communication with atmosphere with said handle in a position to provide a greater degree of brake application, a one-way flow communication opening said passageway around said insuring means to said safety control means, and means including said brake application means for opening said passageway to said chamber in said brake application position of said application means and for disconnecting said passageway from said chamber in said normal position.

ANDREW T. GORMAN.

REFERENCES CITED

The following references are of record in the file of this patent:

UNITED STATES PATENTS

| Number | Name | Date |
|---|---|---|
| 2,166,007 | Hewitt et al. | July 11, 1939 |
| 2,256,283 | Hewitt et al. | Sept. 16, 1941 |